(12) United States Patent
Zhang et al.

(10) Patent No.: US 9,282,535 B2
(45) Date of Patent: Mar. 8, 2016

(54) EFFICIENT LOCATION UPDATES, PAGING AND SHORT BURSTS

(71) Applicant: Apple Inc., Cupertino, CA (US)

(72) Inventors: Hang Zhang, Nepean (CA); Mo-Han Fong, L'Original (CA); Peiying Zhu, Kanata (CA); Wen Tong, Ottawa (CA)

(73) Assignee: APPLE INC., Cupertino, CA (US)

( * ) Notice: Subject to any disclaimer, the term of this patent is extended or adjusted under 35 U.S.C. 154(b) by 290 days.

(21) Appl. No.: 13/666,479

(22) Filed: Nov. 1, 2012

(65) Prior Publication Data

US 2013/0064202 A1    Mar. 14, 2013

Related U.S. Application Data

(62) Division of application No. 13/209,019, filed on Aug. 12, 2011, which is a division of application No. 11/571,094, filed as application No. PCT/CA2005/000992 on Jun. 27, 2005, now Pat. No. 8,014,377.

(60) Provisional application No. 60/619,461, filed on Oct. 15, 2004.

(51) Int. Cl.
*H04W 72/00* (2009.01)
*H04W 68/02* (2009.01)

(52) U.S. Cl.
CPC ..................... *H04W 68/02* (2013.01)

(58) Field of Classification Search
CPC .................................................... H04W 68/02
USPC .......................... 370/329, 335, 341, 349, 471; 455/422.1, 450, 452.1, 456.1, 458
See application file for complete search history.

(56) References Cited

U.S. PATENT DOCUMENTS

| 5,613,214 A | 3/1997 | Shirasawa et al. |
| 5,796,726 A * | 8/1998 | Hassan et al. ................. 370/322 |
| 6,466,544 B1 | 10/2002 | Sen et al. |

(Continued)

FOREIGN PATENT DOCUMENTS

| CA | 2256429 | 10/1998 |
| CA | 2387094 | 4/2001 |

(Continued)

OTHER PUBLICATIONS

Addy, Anthony S., USPTO Office Communication dated Mar. 1, 2010 in relation to U.S. Appl. No. 11/571,094, filed Dec. 21, 2006.

(Continued)

*Primary Examiner* — Babar Sarwar
(74) *Attorney, Agent, or Firm* — Fay Kaplun & Marcin, LLP

(57) ABSTRACT

A mobile terminal in a wireless communication network may be one of several modes of operation. When in an idle mode, the mobile terminal may avoid a lengthy random access procedure normally associated with responding to a page from a base station, if the base station includes in the page an indication of a resource that the mobile terminal may utilize when responding to the page. Additionally, the mobile terminal may transmit an efficient location update MAC header to a base station, whether prompted to by a page from the base station or not. Furthermore, without leaving the idle mode or a sleep mode, the mobile terminal may exchange short data burst messages with a base station.

18 Claims, 18 Drawing Sheets

(56) References Cited

U.S. PATENT DOCUMENTS

| | | |
|---|---|---|
| 6,801,772 B1 | 10/2004 | Townend et al. |
| 6,968,196 B1 | 11/2005 | Back et al. |
| 6,985,728 B2 | 1/2006 | Tiedemann, Jr. et al. |
| 7,058,038 B2 | 6/2006 | Yi et al. |
| 7,069,011 B2 | 6/2006 | Dalal et al. |
| 7,310,303 B2 | 12/2007 | Koo et al. |
| 7,508,798 B2 | 3/2009 | Tong et al. |
| 2003/0050068 A1 | 3/2003 | Woxberg et al. |
| 2003/0210646 A1 | 11/2003 | Ohseki et al. |
| 2004/0001429 A1 | 1/2004 | Ma et al. |
| 2004/0100921 A1* | 5/2004 | Khan .................. 370/321 |
| 2004/0157626 A1 | 8/2004 | Park et al. |
| 2004/0179492 A1 | 9/2004 | Zhang et al. |
| 2005/0030931 A1 | 2/2005 | Sung et al. |
| 2005/0059437 A1* | 3/2005 | Son et al. .................. 455/574 |
| 2005/0148297 A1 | 7/2005 | Lu et al. |
| 2005/0265360 A1 | 12/2005 | Kim et al. |

FOREIGN PATENT DOCUMENTS

| | | |
|---|---|---|
| CA | 2392574 A1 | 1/2004 |
| CN | 1267153 | 9/2000 |
| EP | 0841763 | 5/1998 |
| EP | 1 043 861 | 10/2000 |
| EP | 1379033 A1 | 1/2004 |
| EP | 1392029 | 2/2004 |
| WO | 0079722 A1 | 12/2000 |
| WO | 01/63775 | 8/2001 |
| WO | 01/69859 A1 | 9/2001 |
| WO | 03043251 A2 | 5/2003 |
| WO | 2004039011 A2 | 5/2004 |
| WO | 2004056029 | 7/2004 |

OTHER PUBLICATIONS

Addy, Anthony S., USPTO Office Communication dated Jun. 25, 2010 in relation to U.S. Appl. No. 11/571,094, filed Dec. 21, 2006.
Addy, Anthony S., USPTO Office Communication dated Feb. 15, 2011 in relation to U.S. Appl. No. 11/571,094, filed Dec. 21, 2006.
Addy, Anthony S., USPTO Office Communication dated Apr. 27, 2011 in relation to U.S. Appl. No. 11/571,094, filed Dec. 21, 2006.
Sabharwal, Paul, WIPO Written Opinion mailed Oct. 17, 2005 in relation to Application No. PCT/CA2005/000992.
Nickitas-Etienne, Athina, WIPO International Preliminary Report on Patentability dated Dec. 28, 2006 in relation to Application No. PCT/CA2005/000992.
Sabharwal, Paul, WIPO Written Opinion mailed Jul. 21, 2005 in relation to Application No. PCT/CA2005/000506.
Nickitas-Etienne, Athina, WIPO International Preliminary Report on Patentability dated Oct. 11, 2006 in relation to Application No. PCT/CA2005/000506.
Addy, Anthony S., USPTO Office Communication dated Jan. 19, 2012 in relation to U.S. Appl. No. 13/209,019, filed Aug. 12, 2011.
Addy, Anthony S., USPTO Office Communication dated Apr. 25, 2012 in relation to U.S. Appl. No. 13/209,019, filed Aug. 12, 2011.

* cited by examiner

1500

| Name | Length (bits) | Description |
|---|---|---|
| PBR | 16 | PiggyBack Request<br>The number of bytes of uplink bandwidth requested by the SS/MSS. The bandwidth request is for the CID. The request shall not include any PHY overhead. The request may be incremental.<br>If this sub-header is sent by a MSS in sleep mode and all bits of this field is set to 0, this field indicates that the payload of this PDU is a UL short data burst. |
| PM | 1 | Poll-Me<br>0 = No action<br>1 = Used by the SS/MSS to request bandwidth poll. |
| SI | 1 | Slip Indicator<br>0 = No action<br>1 = Used by the SS/MSS to indicate a slip of uplink grants relative to the uplink queue depth. |

| Syntax | Size | Notes |
|---|---|---|
| SDB_Forecast_IE() { | | |
| Extended DIUC | 4 bits | 0x07 |
| Length | 4 bits | |
| Num_MSSs | 4 bits | |
| For (i=0;i< Num_MSSs;i++) { | | |
| CID | 16 bits | |
| Frame_offset | 4 bits | To indicate the frame where DL SDB to be transmitted or UL SDB to be polled (Frame offset is relative to the current frame) |
| } | | |
| } | | |

| Syntax | Size | Notes |
|---|---|---|
| DL_SDB_IE() { | | |
|   Extended DIUC | 4 bits | 0x07 |
|   Length | 4 bits | |
|   Num_assignment | 4 bits | |
|   For (i=0;i< Num_assignment;i++) { | | |
|     CID | 10 bits | |
|     OFDMA Symbol offset | 8 bits | |
|     Subchannel offset | 8 bits | |
|     Boosting | 3 bits | |
|     No. OFDMA Symbol | 7 bits | |
|     No. Subchannels | 6 bits | |
|     Repetition Coding Indication | 2 bits | |
|     UL_ARQ_resource_assigned | 1 bit | 0: UL resource for the MSS to send ARQ message is not assigned in this IE<br>1: UL resource for the MSS to send ARQ message is assigned in this IE |
|     If ( UL_ARQ_resource_assigned == 1) | | |
|     { | | |
|       Duration | 10 bits | |
|       Repetition Coding_indication | 2 bits | |
|     } | | |
|   } | | |
| Reserved | variable | Padding bits to ensure octet aligned |
| } | | |

| Syntax | Size | Notes |
|---|---|---|
| UL_SDB_IE() { | | |
|     Extended UIUC | 4 bits | 0x06 |
|     Length | 4 bits | |
|     Num_assignment | 4 bits | |
|     For (i=0;i< Num_assignment;i++) { | | |
|         CID | 10 bits | |
|         ARQ_enabled | 1 bit | 1: ARQ enabled and the MSS shall wait for receiving a ACK for this UL data burst transmission<br>0: NON-ARQ enabled and the MSS shouldn't expect a ACK for this UL data burst transmission |
|         Duration | 10 bits | |
|         Repetition Coding Indication | 2 bits | |
|     } | | |
|     Reserved | variable | Padding bits to ensure octet aligned |
| } | | |

| Syntax | Size | Notes |
| --- | --- | --- |
| SDB_Ack_IE() { | | |
| Extended UIUC | 4 bits | 0x06 |
| Length | 4 bits | |
| Ack bitmap | Variable | The length is set to the number of assignments with AQR_enabled indicator equaling to 1 in the UL_SDB-in_Idle IE corresponding to the UL SDB transmission in the previous frame.<br><br>1: Acked; 0:Nacked |
| Reserved | Variable | Padding bits to ensure octet aligned |
| } | | |

| Name | Type (1byte) | Length | Value |
|---|---|---|---|
| Location Update Request/SDB Indication | | 1 | Bit 0: location update request<br>Bit 1: SDU indication<br>Bits 2-7: reserved |

| Name | Type (1byte) | Length | Value |
|---|---|---|---|
| Location Update Request/SDB Indication | | 1 | Bit 0: location update response<br>Bit 1: SDU indication<br>Bits 2-7: reserved |

FIG. 21

EFFICIENT LOCATION UPDATES, PAGING AND SHORT BURSTS

CROSS REFERENCE TO RELATED APPLICATIONS

This application is a divisional of U.S. patent application Ser. No. 13/209,019, filed on Aug. 12, 2011, which is a divisional of U.S. patent application Ser. No. 11/571,094, filed on Dec. 21, 2006 (now U.S. Pat. No. 8,014,377), which is a National Phase Entry of International PCT Application No. PCT/CA2005/000992, filed on Jun. 27, 2005, which claims the benefit of prior U.S. Provisional Application No. 60/619,461, filed on Oct. 15, 2004. Those prior patent applications are hereby incorporated by reference in their entireties as though fully and completely set forth herein.

FIELD OF THE INVENTION

The present invention relates to wireless transmission of information and, in particular, to methods for efficiently transmitting data such as location updates and short data bursts from a mobile terminal to a base station and paging and short data bursts from a base station to a mobile terminal.

BACKGROUND

Wireless metropolitan area networks (MAN) are networks implemented over an air interface for fixed, portable and mobile broadband access systems. Some Wireless MANs utilize orthogonal frequency division multiplexing (OFDM) for signaling between mobile terminals, and/or subscriber stations (SS), and base stations. OFDM is a form of multiplexing that distributes data over a number of carriers that have a very precise spacing in the frequency domain. The precise spacing of the carriers provides several benefits such a high spectral efficiency, resiliency to radio frequency interference and lower multi-path distortion. Due to its beneficial properties and superior performance in multi-path fading wireless channels, OFDM has been identified as a useful technique in the area of high data-rate wireless communication, for example wireless MANs. Orthogonal frequency division multiple access (OFDMA) is a multiple access technology that utilizes OFDM techniques.

One standard under development by the Institute for Electrical and Electronics Engineers (IEEE) is called 802.16 or "Air Interface for Fixed Broadband Wireless Access Systems" is closely related to the development of wireless MANs. An amendment to IEEE 802.16 called IEEE 802.16 (e) covers "Physical and Medium Access Control Layers for Combined Fixed and Mobile Operation in Licensed Bands".

Multiple Input Multiple Output (MIMO) antenna systems are also being considered for incorporation into Wireless MANs. MIMO systems use multiple transmitting and multiple receiving antennas for communication of information. MIMO antenna systems allow spatial diversity. Spatial diversity that takes advantage of transmitting data from multiple sources that have a known physical spacing.

A typical cellular system that may form the basis for a wireless MAN includes a number of base stations controlled by a base station controller. The number of base stations define a corresponding number of cells. Within the cells, mobile terminals may roam and use a base station for wirelessly communicating with associated voice and data networks. In one case, the base station and mobile terminal communicate using time division multiplexing, wherein messages are exchanges formatted into frames. Portions of the frames may be defined as "channels" for carrying specific information.

As is known, a base station may initiate a transmission to a mobile terminal or a mobile terminal may initiate a transmission to a base station.

A random-access channel (RACH) is an uplink transport channel that may be used for initiating a transmission from a mobile terminal to a base station. After successful acquisition of a signal from a base station, the mobile terminal may read a number of parameters from a broadcast channel transmitted by the base station. To initiate a transmission to the base station, the mobile terminal first has to make itself known to the base station using a physical random access procedure.

The mobile terminal is unlikely to be able to accurately predict the transmission power that is required for a RACH transmission to be heard by the base station. As a result, the mobile terminal may, according to the physical random access procedure, transmit a so-called RACH preamble starting at low power. The mobile terminal may then increase the power level of the transmission of subsequent RACH preambles until the mobile terminal receives an acknowledgement of receipt of a RACH preamble from the base station. In the case of a positive acknowledgement, the mobile terminal transmits a RACH message part at the same power used for the most recent preamble transmission. The RACH message part may include an uplink resource request.

Additionally, the random-access channel may be used by a mobile terminal, or an SS, to transmit a "paging response". When a base station initiates a transmission to a mobile terminal, the base station transmits a page to the mobile terminal. Upon receipt of a page, the mobile terminal performs the physical random access procedure, receives a positive acknowledgement, and transmits a RACH message part at the same power used for the most recent preamble transmission. The RACH message part, in this case, includes a paging response.

Notably, both uplink resource requests and paging responses are treated similarly. When a mobile terminal is initiating an uplink transmission or responding to a page, the mobile terminal may be required to perform the lengthy random access procedure.

For certain communications from mobile terminal to base station, there are alternatives to the lengthy random access procedure. One such alternative may be used by a mobile terminal to provide a location update to a base station.

Mobile terminals are known to have modes of operation, defined by standards (e.g., IEEE 802.16(e)) to which the operation of the mobile operation adheres. Among the modes of operation are an "Active" mode, wherein the mobile terminal is engaged in a bidirectional communication with a base station, and an "Idle" mode, wherein the mobile terminal does not have an immediate requirement for communication with a base station.

Ideally, a base station controller maintains general location information for a particular mobile terminal. If, for instance, a connection is to be established with the particular mobile terminal, the base station controller may initiate paging at each base station in one or more paging groups of base stations in the general location of the particular mobile terminal. In a first case, the particular mobile terminal frequently sends location update information to a proximate base station, which forwards the location information to the base station controller. The base station controller may then be very precise in instructing base stations (perhaps only the proximate base station) to send pages to the particular mobile terminal. In a second case, the particular mobile terminal seldom sends location update information to a proximate base station. The base station controller may then be required to instruct a great many base stations to attempt to send pages to the particular mobile terminal in order that a base station proximate to the particular mobile terminal may be so instructed. The first case has high accuracy at the expense of high overhead. The second case in very inaccurate, but the network is not clogged with mobile terminals reporting location updates.

Typically, a mobile terminal will transmit a location update triggered by movement from being within range of a base station in a first paging group to being within range of a base station in a second paging group.

The previously mentioned alternative communication method, used by a mobile terminal to provide a location update to a base station, involves a contention-based resource. From messages broadcast by a given base station, a mobile terminal may determine members of a pool of Pseudorandom Noise (PN) codes that may be used to encode a location update. The base station may select a PN code from the pool and encode a location update for the base station. Unfortunately, another mobile terminal in the same cell may simultaneously select the same PN code for encoding a location update. In such a case, neither location update is received and registered by the base station and it may be considered that a "collision" has occurred.

In addition to the active and idle modes of operation discussed above, a mobile terminal may also be in a "Sleep" mode and a "Normal" mode as defined in IEEE 802.16(e).

Many problems may be perceived associated with the current draft of the IEEE 802.16(e) standard.

For a first example, downlink or uplink transmission of a protocol data unit (PDU) within a listening window are performed in normal mode. Unfortunately, an uplink PDU received within a listening window cannot trigger a mode transition. That is to say, if a mobile terminal wants to return to normal mode from sleep mode, the mobile terminal will have to wait until a sleep window. Such waiting may be considered to result in an unnecessary delay.

For a second example, any downlink/uplink short data burst traffic to/from a mobile terminal in sleep mode must be sent during a listening window of the mobile terminal. It may be considered that, for applications with deterministic traffic patterns, there is room for improvement.

For a third example, any uplink PDU sent during a sleep-window, other than a RNG-REQ message and a DPC-REQ message, may be considered an indication of a mode transition of a mobile terminal in sleep mode. As such, an uplink short data burst must be either sent during a listening window, which may be considered to result in unnecessary delay, or sent after entering normal mode, which may be considered to cause unnecessary mode transmission overhead.

The current draft of the IEEE 802.16(e) standard does not support a downlink unicast short data burst to a mobile terminal that is in idle mode or an uplink short data burst from a mobile terminal that is in idle mode. It is considered that such support would be beneficial.

SUMMARY

A mobile terminal in a wireless communication network may be one of several modes of operation. When in an idle mode, the mobile terminal may avoid a lengthy random access procedure normally associated with responding to a page from a base station, if the base station includes in the page an indication of a resource that the mobile terminal may utilize when responding to the page. Additionally, the mobile terminal may transmit an efficient location update MAC header to a base station, whether prompted to by a page from the base station or not. Furthermore, without leaving the idle mode or a sleep mode, the mobile terminal may exchange short data burst messages with a base station.

Advantageously, aspects of the invention allow for battery efficient and resource efficient operation.

In accordance with an aspect of the present invention there is provided a method of initiating communication with a terminal. The method includes allocating a dedicated uplink resource for a predetermined period of time, transmitting a page to a terminal, the page indicating the dedicated uplink resource, determining that the predetermined period of time has not expired and receiving a response to the page from the terminal using the dedicated uplink resource.

In accordance with an aspect of the present invention there is provided, at a mobile terminal in a wireless communication system, a method of initiating communication with a base station. The method includes selecting a candidate pseudorandom noise code from a plurality of predefined pseudorandom noise codes, transmitting the candidate pseudorandom noise code to the base station, receiving an allocation message from the base station, where the allocation message indicates an allocated resource and transmitting a location update Media Access Control header to the base station, where the transmitting the location update Media Access Control header utilizes the allocated resource.

In accordance with an aspect of the present invention there is provided, at a mobile terminal in a mobile communication system, a method of initiating communication with a base station. The method includes receiving a paging message from the base station, responsive to the receiving the paging message, transmitting a location update indicator message to the base station, receiving an allocation message from the base station, where the allocation message indicates an allocated resource and transmitting a location update Media Access Control header to the base station, where the transmitting the location update Media Access Control header utilizes the allocated resource.

In accordance with an aspect of the present invention there is provided at a mobile terminal in a wireless communication system, a method of initiating communication with a base station. The method includes selecting a candidate pseudorandom noise code from a plurality of predefined pseudorandom noise codes, transmitting the candidate pseudorandom noise code to the base station, receiving an allocation message from the base station, where the allocation message indicates an allocated resource and transmitting a ranging request message to the base station, where the ranging request message includes a location update and the ranging request message utilizes the allocated resource.

In accordance with an aspect of the present invention there is provided, at a mobile terminal in a mobile communication system, a method of initiating communication with a base station. The method includes receiving a paging message from the base station, responsive to the receiving the paging message, transmitting a location update indicator message to the base station, receiving an allocation message from the base station, where the allocation message indicates an allocated resource and transmitting a ranging request message to the base station, where the ranging request message includes a location update and the ranging request message utilizes the allocated resource.

In accordance with an aspect of the present invention there is provided, at a mobile terminal in sleep mode in a wireless communication network, a method of requesting uplink resources. The method includes transmitting a request message including a byte request field for indicating a number of bytes requested and a connection ID field for indicating an identity of a connection.

In accordance with an aspect of the present invention there is provided, at a mobile terminal in sleep mode in a wireless communication network, a method of indicating that payload in a corresponding protocol data unit is an uplink Short Data Burst. The method includes transmitting a message, the message including a field for use in requesting a bandwidth poll and a field for indicating a slip of uplink grants relative to an uplink queue depth.

In accordance with an aspect of the present invention there is provided, at a base station in a wireless communication network, a method of alerting a mobile terminal regarding future downlink short data burst transmissions. The method including transmitting a short data burst forecast information element, the information element including: an indication of an identity of a connection; and an indication of a frame during which the downlink short data burst is to be transmitted.

In accordance with an aspect of the present invention there is provided, at a base station in a wireless communication network, a method of assigning downlink resources to a mobile terminal, the method comprising transmitting a downlink short data burst information element, the information element including an indication of whether an uplink resource is assigned in the information element for the mobile terminal to send an acknowledgement request message.

In accordance with an aspect of the present invention there is provided, at a base station in a wireless communication network, a method of assigning uplink resources to a mobile terminal, the method comprising transmitting an uplink short data burst information element, the information element including an indication of whether the mobile terminal is to wait to receiving an acknowledgment for each data burst transmission.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention:

FIG. 15 illustrates fields of a Grant Management subheader according to an embodiment of the present invention;

FIG. 16 illustrates fields of a SDB Forecast information element according to an embodiment of the present invention;

FIG. 17 illustrates fields of a downlink SDB information element according to an embodiment of the present invention;

FIG. 18 illustrates fields of an uplink SDB information element according to an embodiment of the present invention;

FIG. 19 illustrates fields of an SDB_Ack information element according to an embodiment of the present invention;

FIG. 20 illustrates RNG_REQ Message Encodings according to an embodiment of the present invention; and FIG. 21 illustrates RNG_RSP Message Encodings according to an embodiment of the present invention.

DETAILED DESCRIPTION

In order to facilitate downlink data transmission by a base station, some feedback information, such as carrier-to-interference (C/I) measurements and mobile terminal indications, such as MIMO/permutation modes, may be sent from a mobile terminal to the base station. The Media Access Control (MAC) layer of a network can be used to facilitate this feedback of information.

Figure 1:
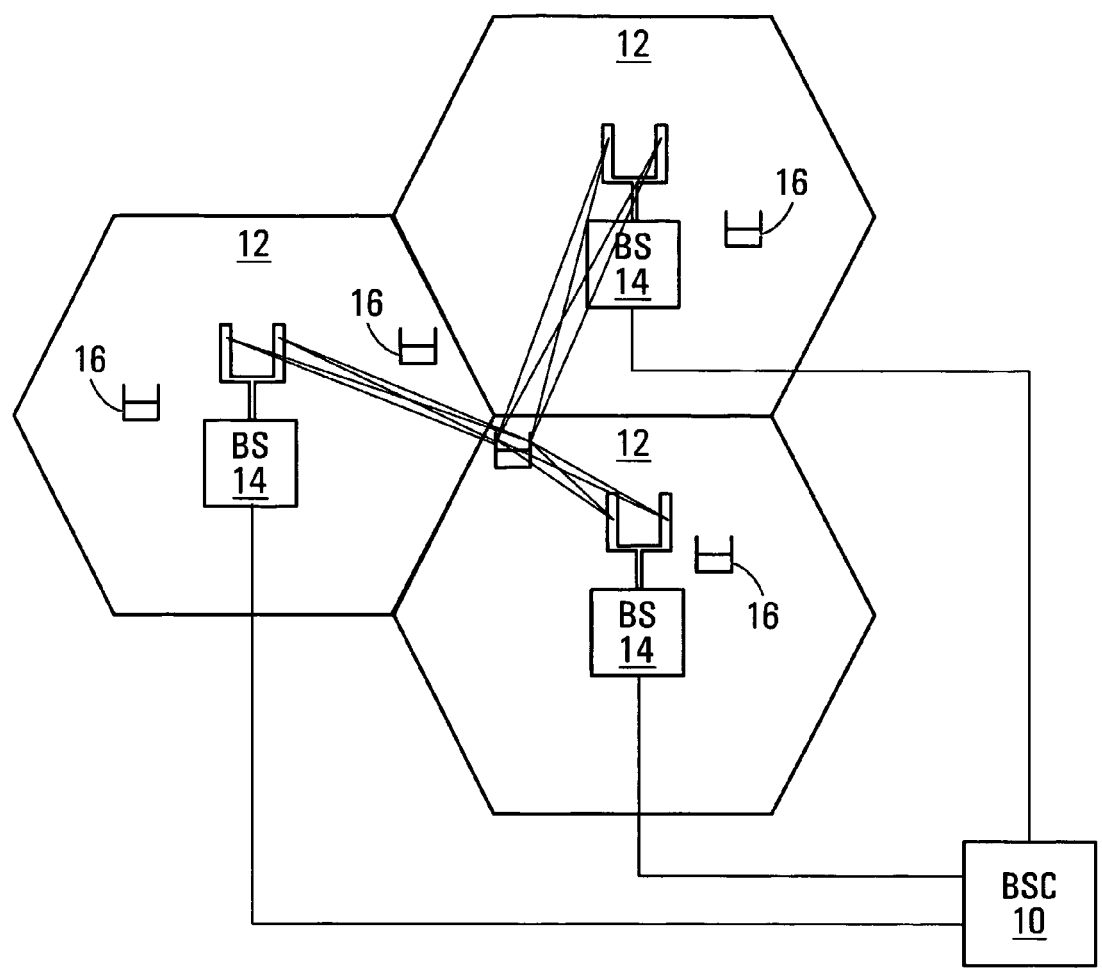
FIG. 1 is a block diagram of a cellular communication system.

For the purposes of providing context for embodiments of the invention for use in a communication system, FIG. 1 shows a base station controller (BSC) 10 which controls wireless communications within multiple cells 12, which cells are served by corresponding base stations (BS) 14. In general, each base station 14 facilitates communications using OFDM with mobile and/or wireless terminals 16, which are within the cell 12 associated with the corresponding base station 14. The movement of the mobile terminals 16 in relation to the base stations 14 is known to result in significant fluctuation in channel conditions. As illustrated, the base stations 14 and mobile terminals 16 may include multiple antennas to provide spatial diversity for communications.

Figure 2:
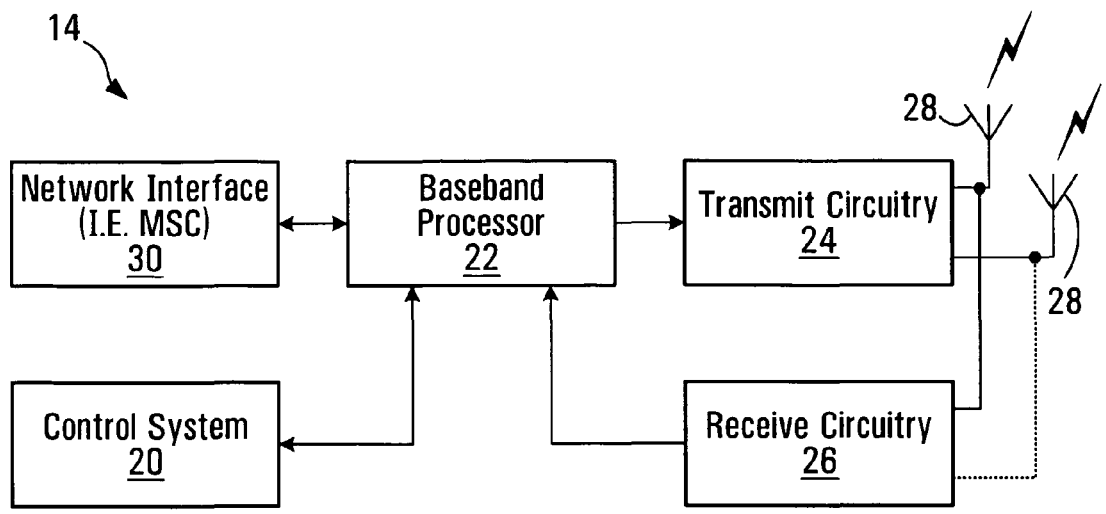
FIG. 2 is a block diagram of a base station according to an embodiment of the present invention.

A high level overview of the mobile terminals 16 and base stations 14 upon which aspects of the present invention are implemented is provided prior to delving into the structural and functional details of the preferred embodiments. With reference to FIG. 2, a base station 14 is illustrated. The base station 14 generally includes a control system 20, a baseband processor 22, transmit circuitry 24, receive circuitry 26, multiple antennas 28 and a network interface 30. The receive circuitry 26 receives radio frequency signals bearing information from one or more remote transmitters provided by the mobile terminals 16 (illustrated in FIG. 1). Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14.

On the transmit side, the baseband processor 22 receives digitized data, which may represent voice, data, or control information, from the network interface 30 under the control of control system 20 and encodes the data for transmission. The encoded data is output to the transmit circuitry 24, where the encoded data is modulated by a carrier signal having a desired transmit frequency or frequencies. A power amplifier (not shown) amplifies the modulated carrier signal to a level appropriate for transmission and delivers the modulated carrier signal to the antennas 28 through a matching network (not shown). Modulation and processing details are described in greater detail below.

Figure 3:
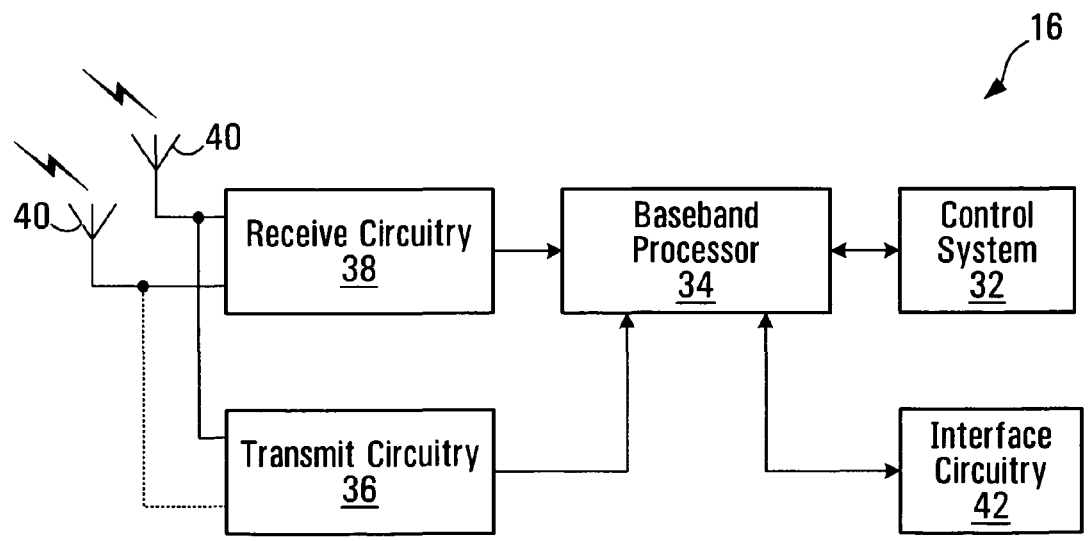
FIG. 3 is a block diagram of a mobile terminal according to an embodiment of the present invention.

With reference to FIG. 3, a mobile terminal 16 configured according to one embodiment of the present invention is illustrated. The mobile terminal 16 may be configured, in a manner similar to base station 14, to include a control system 32, a baseband processor 34, transmit circuitry 36, receive circuitry 38, multiple antennas 40 and user interface circuitry 42. The receive circuitry 38 receives radio frequency signals bearing information from one or more base stations 14. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more DSPs and ASICs.

For transmission, the baseband processor 34 receives digitized data, which may represent voice, data or control information, from the control system 32. The baseband processor 34 may then encode the digitized data for transmission. The encoded data is output to the transmit circuitry 36, where the encoded data is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). Various modulation and processing techniques available to those skilled in the art are used for signal transmission between the mobile terminal 16 and the base station 14.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 14 to the mobile terminals 16. Each base station 14 is equipped with "n" transmit antennas 28, and each mobile terminal 16 is equipped with "m" receive antennas 40. Notably, the respective antennas can be used for reception and transmission using appropriate duplexers or switches and are so labeled only for clarity.

Figure 4:
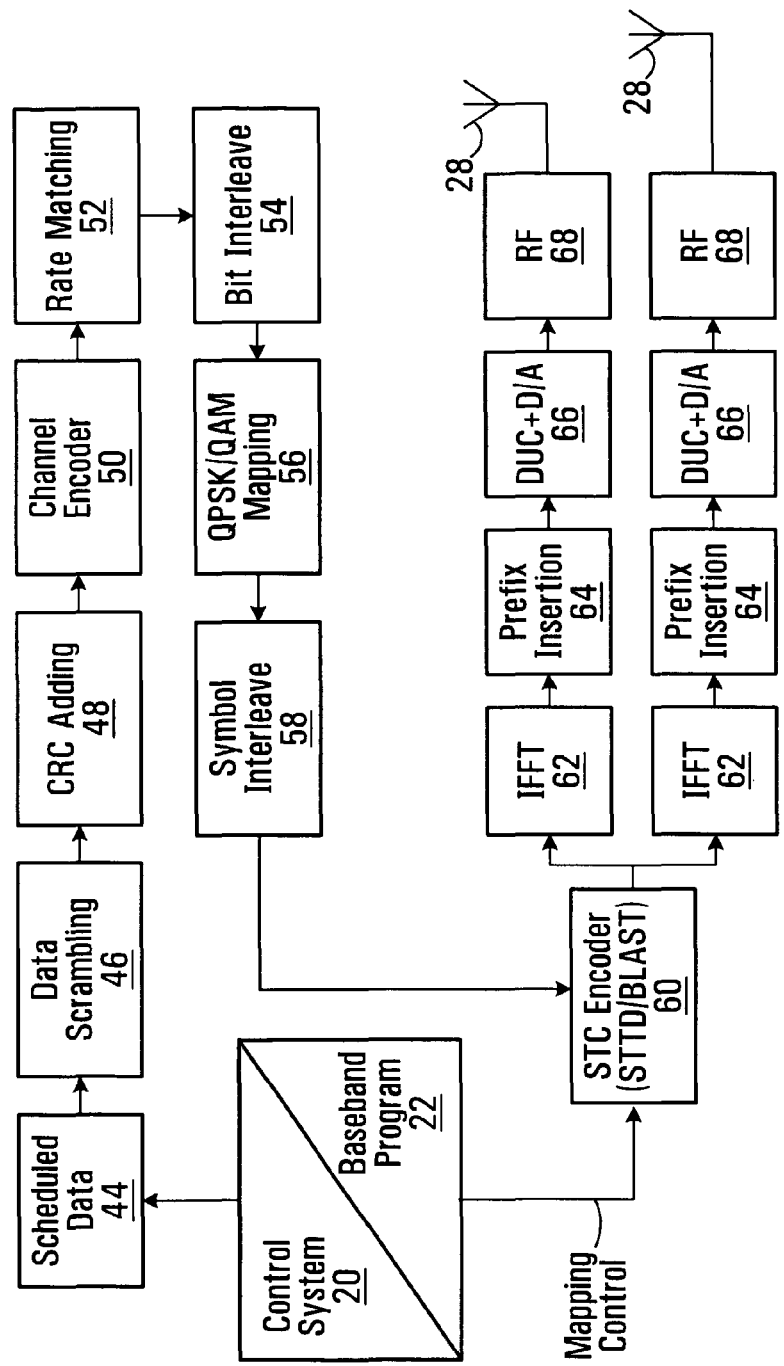
FIG. 4 is a block diagram of a logical breakdown of an OFDM transmitter architecture according to one embodiment of the present invention.

With reference to FIG. 4, a logical OFDM transmission architecture will be described. Initially, the base station controller 10 (see FIG. 1) will send data to be transmitted to various mobile terminals 16 to the base station 14. The base station 14 may use channel quality indicators (CQIs) associated with the mobile terminals 16 to schedule the data for transmission as well as select appropriate coding and modulation for transmitting the scheduled data. The CQIs may be received directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI associated with the particular mobile terminal 16. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal 16. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with respect to FIG. 2 will provide a mapping control signal to control STC encoding. At this point, assume the symbols for the "n" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 5:
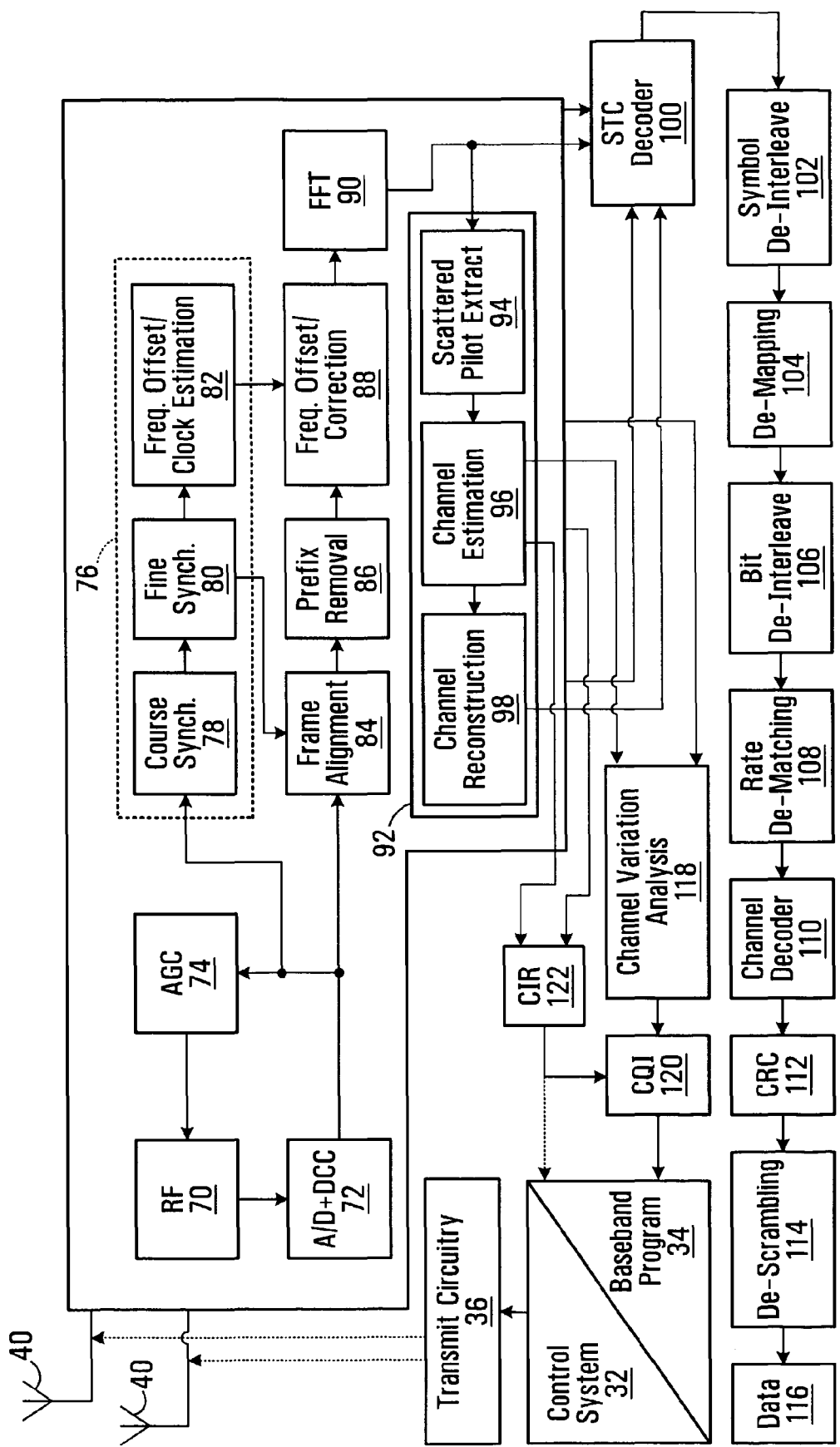
FIG. 5 is a block diagram of a logical breakdown of an OFDM receiver architecture according to one embodiment of the present invention.

Reference is now made to FIG. 5 to illustrate reception of the transmitted signals by a mobile terminal 16. Upon arrival of the transmitted signals at each of the antennas 40 of the mobile terminal 16, the respective signals are demodulated and amplified by corresponding RF circuitry 70. For the sake of conciseness and clarity, only one of the two receive paths are described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

Figure 6:
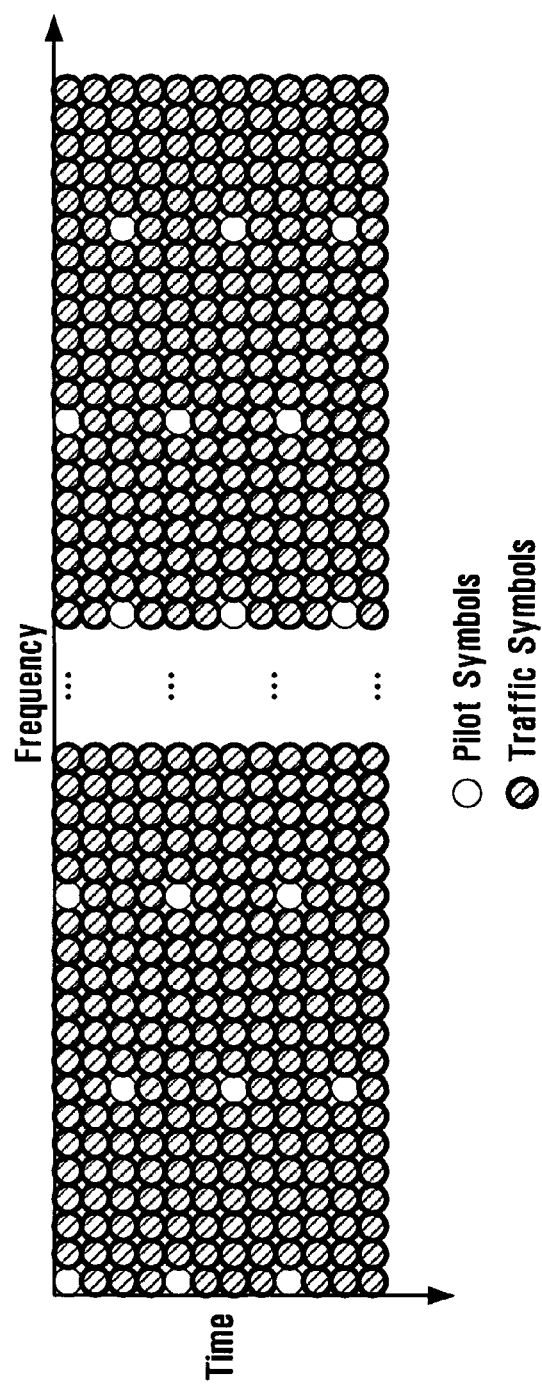
FIG. 6 is a diagram of a pilot pattern used in an OFDM environment.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96 and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. FIG. 6 illustrates an exemplary scattering of pilot symbols among available sub-carriers over a given time and frequency plot in an OFDM environment. Continuing with FIG. 5, the processing logic 92 compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion and provides it to the de-scrambling logic 114 for de-scrambling using the known base station de-scrambling code to recover the originally transmitted data 116.

In parallel to recovering the data 116, a CQI, or at least information sufficient to create a CQI at the base station 14, is determined and transmitted to the base station 14. As noted above, the CQI may be a function of the carrier-to-interference ratio (C/I), as well as the degree to which the channel response varies across the various sub-carriers in the OFDM frequency band. The channel gain for each sub-carrier in the OFDM frequency band being used to transmit information may be compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

FIGS. 1 to 5 provide one specific example of a communication system that could be used to implement embodiments of the invention. It is to be understood that embodiments of the invention can be implemented with communications systems having architectures that are different than the specific example, but that operate in a manner consistent with the implementation of the embodiments as described herein.

The MAC layer is used to enable features in the physical (PHY) layer in an OFDMA air interface framework. Frames are a format used to transmit data over the air interface between a base station 14 and a mobile terminal 16. The mobile terminal 16 is, for example, any known wireless device such as a cellular telephone, a computer with a wireless modem or a PDA. Some types of information elements (IE) are included in the frame to provide a structure within the frame for defining where downlink information and uplink information are located within the frame.

Figure 7:
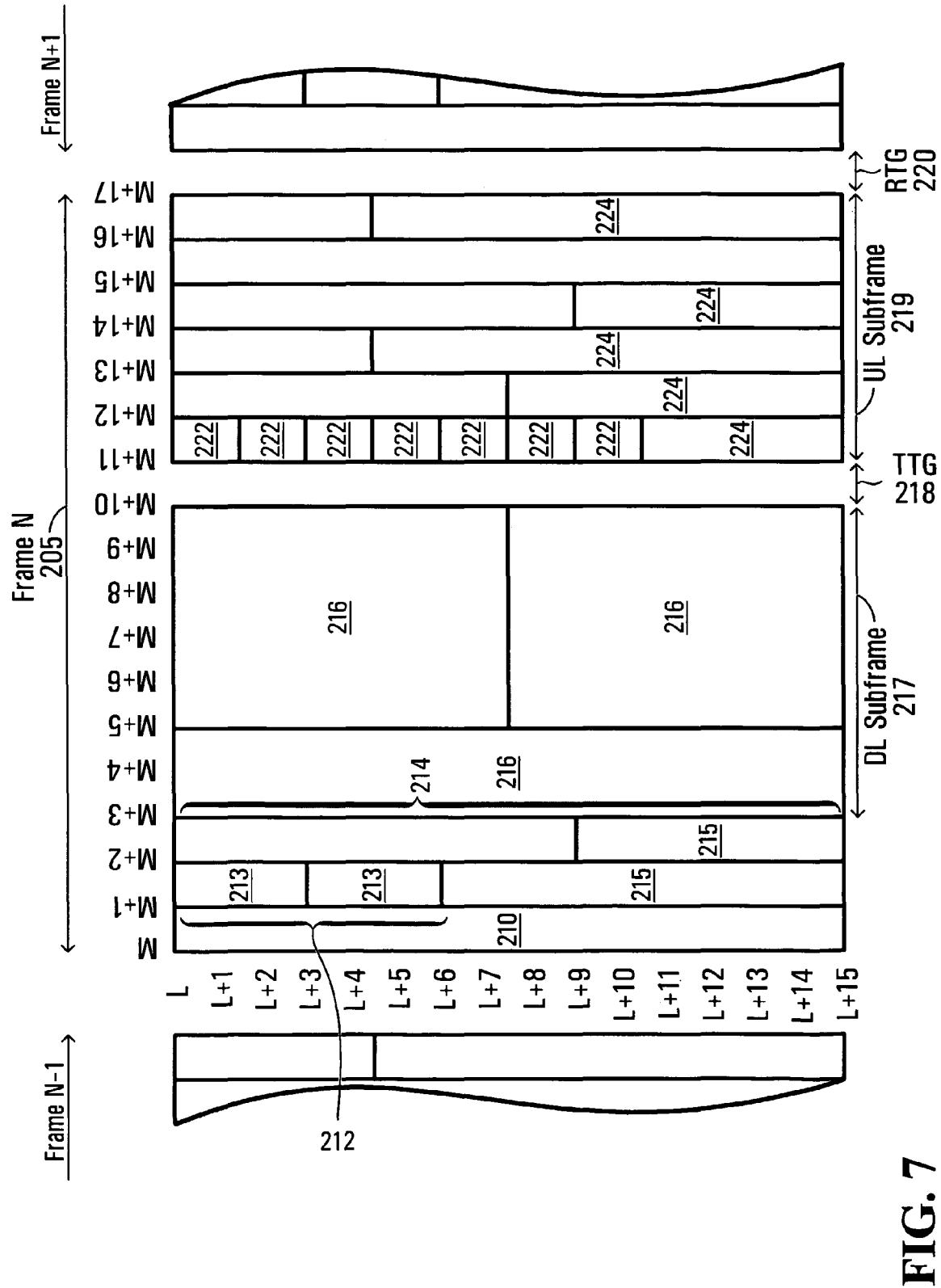
FIG. 7 is a schematic view of an OFDM frame for use with embodiments provided by the invention.

FIG. 7 shows a schematic diagram of an example frame used in conjunction with embodiments of the invention. Details as shown for a frame labeled "Frame N" which is preceded by Frame "N−1" and followed by "Frame N+1", all form part of an ongoing sequence of frames. The frame has a two dimensional appearance which is represented in terms of a rows and columns. The rows are designated by logical sub-channel numbers L, L+1, . . . , L+15 and the columns are designated by OFDM symbol numbers M, M+1, . . . , M+15. Logical sub-channels are designated groupings of active sub-carriers. Active subcarriers are any one of data subcarriers for data transmission, pilot subcarriers for synchronization or subcarriers that do not involve direct transmission, but are used as transition guards between parts of the frame. In the frame N of FIG. 7, a preamble 210 is included in a first OFDM symbol M. A second OFDM symbol M+1 and a third OFDM symbol M+2 include both a downlink (DL) mapping component 212 including one or more information elements 213 and an uplink (UL) mapping component 214 including one or more information elements 215. Other broadcast messages (not shown) may be included as well. Subsequent OFDM symbols contain a DL subframe 217. The DL subframe 217 contains DL information allocated to regions 216 of the DL subframe 217 to be transmitted to one or more mobile terminals 16. Following the DL subframe 217 is a transmit/receive/transition guard (TTG) 218. After the TTG 218 is a UL subframe 219 containing UL information allocated to designated regions 224 of the UL subframe to be transmitted back to the base station 14. The UL subframe 219 also includes fast feedback channels 222 that are used to allow the mobile terminal 16 to report information to the base station 14. For example, a fast feedback channel 222 can be designated as a channel to indicate the air interface channel quality between the base station 14 and the mobile terminal 16. Following the UL subframe 219 is a receive/transmit transition guard (RTG) 220. Frames N−1 and N+1 have a similar composition.

Region 216 of the DL subframe 217 is known to contain protocol data units (PDU). PDUs are known to include some or all of the following: a MAC header, MAC sub-headers and a MAC payload.

The data frame of FIG. 7 is an example of a time division duplex (TDD) data frame. It is to be understood that embodiments of the invention are also applicable to frequency division duplex (FDD) operation and OFDMA operation.

The situation wherein a mobile terminal 16 is initiating an uplink transmission by using the random-access channel (RACH) may be considered a random event that is, from the perspective of a base station 14, unpredictable. However, the situation wherein a mobile terminal 16 is transmitting a response to a page from a base station 14 may be considered a deterministic event and, accordingly, the transmission of a paging response is an event that can be predicted by the base station 14.

According to aspects of the present invention, the heretofore lengthy random access procedure associated with the transmission of a paging response to a base station 14 may be avoided. At the time at which the base station 14 transmits a page to a mobile terminal 16, the base station 14 can anticipate that the paged mobile terminal 16 will require an uplink resource to transmit a response to the page.

Figure 8:
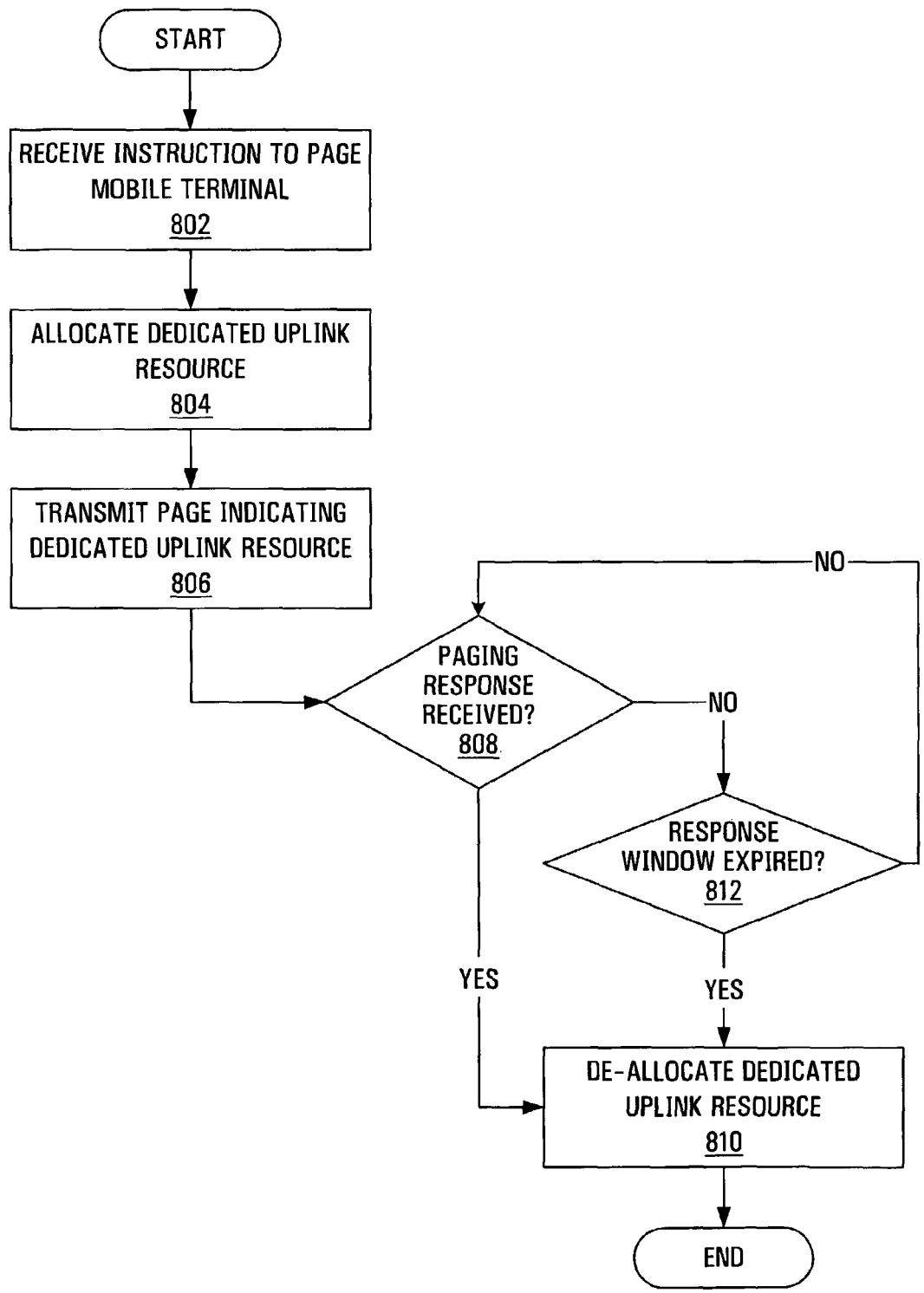
FIG. 8 illustrates steps in an efficient paging method according to an embodiment of the present invention.

Accordingly, in operation, a controller (such as the physical base station controller 10 or a logical controller, for example, a paging controller) may transmit an instruction to each base station 14 in a paging group to page a particular mobile terminal 16. A given base station 14, whose actions are summarized in FIG. 8, may receive the instruction (step 802) from the controller. The given base station 14 may then allocate a dedicated uplink resource (step 804) to the mobile terminal 16 and transmit a page to the particular mobile terminal 16 including an indication of the uplink resource (step 806). The assignment of the dedicated uplink resource may be time limited. That is, each base station 14 expects a paging response before the expiry of a response window having a predetermined duration. The given base station 14 monitors received traffic to determine whether a paging response has been received (step 808) from the particular mobile terminal 16. If a paging response is received corresponding to the page during the monitoring, the given base station 14 may de-allocate the dedicated uplink resource (step 810). The monitoring (step 808) is limited by the duration of the response window (step 812). If the response window duration expires, the given base station 14 may de-allocate the dedicated uplink resource (step 810) despite not having received a response to the page.

The term "resource" is used to cover many possibilities. In a time division duplex case, a resource may be considered a channel in a time frame. In a Code Division Multiple Access (CDMA) case, a resource may be considered a pseudorandom noise code. In an OFDMA case, a resource may be considered to be two-dimensional and include a time and a sub-channel frequency (tone).

Most likely, the mobile terminal 16 transmits a paging response using the dedicated uplink resource indicated in a page from only one of the base stations 14. As discussed, upon receiving the response to the page, the given base station 14 may then de-allocate the dedicated uplink resource. For the rest of the base stations 14 in the paging group, upon recognizing that a paging response has not been received at the expiry of the response window (step 812), each of the rest of the base stations 14 may then de-allocate the corresponding dedicated uplink resource (step 810). In the event that the response window expires for all of the base stations 14 in the paging group, the mobile terminal 16 is still allowed to transmit a paging response. However, the paging response may not be transmitted using the dedicated uplink resource and may, therefore, be transmitted using the normal random access procedure.

As discussed, a page is a base station 14 to mobile terminal 16 transmission. In contrast, a location update is a mobile terminal 16 to base station 14 transmission.

The idle mode is described in Section 6.3.21 of IEEE 802.16e as an optional mode. The paging groups are defined to enable reasonable paging overhead and reasonable accuracy of mobile terminal location. According to the amendment, a mobile terminal 16 in idle mode shall transmit a location update to a base station 14 either when the mobile terminal 16 has entered a new paging group or when the mobile terminal 16 is requested to update its location by the base station 14. In the current standard, the location update procedure is similar to an initial ranging procedure.

In overview, the purpose of a location update is to inform the controller of a mobile terminal 16 location, rather than to initiate an entry into a network. Therefore, it is proposed herein to simplify the current location update procedure to eliminate unnecessary overhead and delay. New location update methods are provided.

In one method, location update codes are introduced used for mobile terminal 16 initiated location update. In another method, for base-station-initiated location update, a code is assigned to a mobile terminal 16 when the base station 14 pages an idle mobile terminal 16. An authentication key renewal option is also introduced.

It is known to use an initial ranging contention channel as part of a network entry algorithm. In such a network entry algorithm, a mobile terminal 16 transmits a ranging request (RNG-REQ) message to a base station 14 on the initial ranging contention channel.

Figure 9:
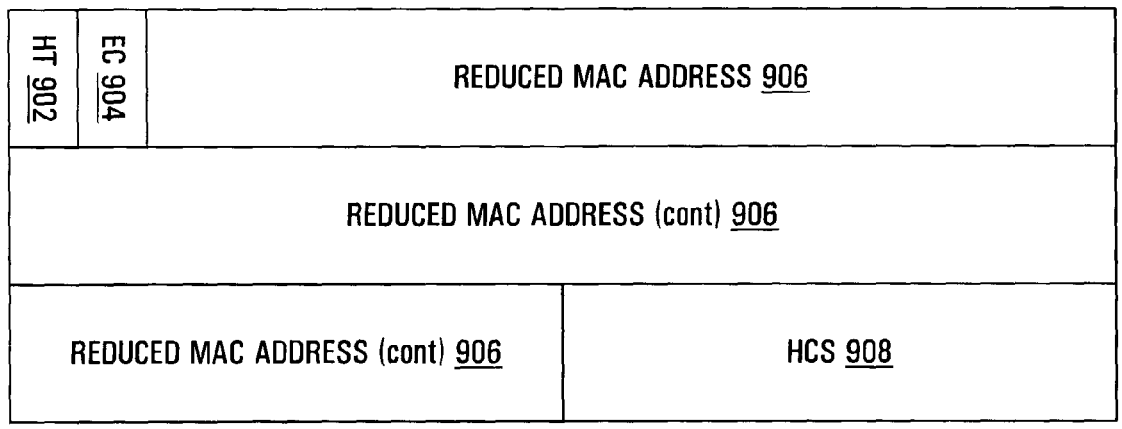
FIG. 9 illustrates a location update MAC header according to an embodiment of the present invention.

It is known that a mobile terminal 16 may select from specified pools of codes to accomplish separate tasks. For instance, a pool of codes are configured for use by the mobile terminal 16 for establishing initial access to a network. Additionally, a pool of codes are configured for use by the mobile terminal 16 for bandwidth requests and a pool of codes are configured for use by the mobile terminal 16 for use in a handoff between base stations 14. It is proposed herein to configure a further pool of codes for use in providing location updates. Additionally, a novel MAC header 900 is proposed, as illustrated in FIG. 9.

The MAC header 900 includes an HT field 902 for indicating a header type, an EC field 904 for indicating whether encryption is used, a reduced MAC address field 906 and a HCS field 908 for indicating a header check sequence. Where the contents of the HT field 902 are set to 0, it is considered that the MAC header 900 is a bandwidth request/location update header. Where the contents of the EC field are set to 1 by a mobile terminal 16, the MAC header 900 is considered to be a location update header. Furthermore, when the contents of the EC field 904 are set to 1, the following 38 bits (i.e., the reduced MAC address field 906) is considered to be representative of the least significant 38 bits of the 48-bit MAC address of the mobile terminal 16.

Figure 10:
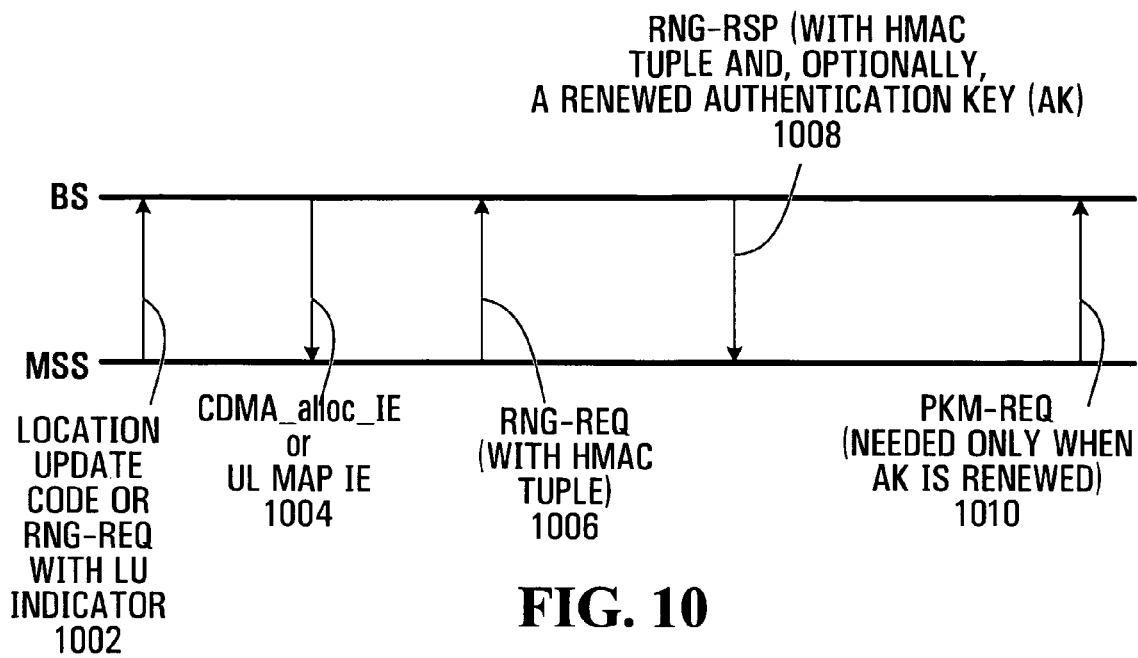
FIG. 10 is a signaling diagram for communication between a base station and a wireless terminal according to one embodiment of the invention.

In operation in view of FIG. 10, a mobile terminal 16 may initiate a location update by transmitting, to a base station 14, a location update indication 1002 on a ranging channel by sending a code randomly selected from code pool defined for the purpose of location updates. After the base station 14 receives the location update indication 1002, the base station 14 allocates a dedicated resource to the mobile terminal 16 to use for transmission of a location update information. The base station 14 may indicate the dedicated resource to the mobile terminal 16 in a CDMA_alloc_IE message or in an uplink MAP information element 1004. The mobile terminal 16 may then use the dedicated resource to transmit a RNG-REQ message 1006 including location update information.

The base station 14 then sends back an acknowledgment in the form of a RNG-RSP message 1008, which may include a renewed authentication key. If the RNG-RSP message 1008 includes a renewed authentication key, the mobile terminal 16 replies with a PKM-REQ (Privacy Key Management Request) message 1010.

Figure 11:
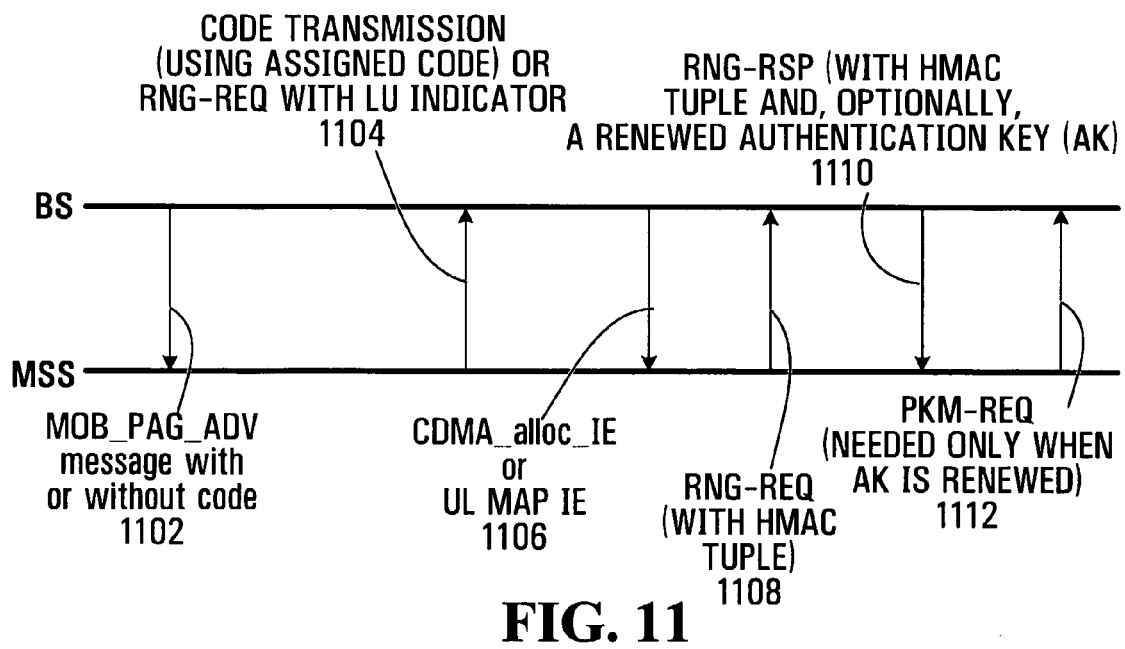
FIG. 11 is a signaling diagram for communication between a base station and a wireless terminal according to another embodiment of the invention.

FIG. 11 illustrates an exchange between a base station (BS) 14 and a mobile terminal (MSS) 16 for a location update initiated by the base station 14. To initiate the location update, the base station 14 may transmit a paging message, identified as MOB_PAG_ADV 1102. The paging message 1102 may or may not include an indication of a code and an opportunity assigned by the base station 14 to the mobile station 16. Where the paging message 1102 has included a code and an opportunity, the code may be transmitted by the mobile terminal 16 to the base station 14 as a location update indication. Alternatively, the mobile terminal 16 may transmit a RNG-REQ message with a location update indicator. Upon receipt of either type of response 1104 to the paging message 1102, the base station 14 may be able to determine aspects of the channel including such aspects as power, time and frequency of the mobile terminal 16. With knowledge of such aspects of the channel, the base station 14 may allocate a dedicated resource to subsequent communication between the base station 14 and the mobile terminal 16 (such as registration, etc.).

After the base station 14 receives the code or RNG-REQ message 1104, the base station 14 allocates a dedicated resource to the mobile terminal 16 to use for transmission of location update information. The base station 14 may indicate the dedicated resource to the mobile terminal 16 in a CDMA_alloc_IE message or in an uplink MAP information element 1106. The mobile terminal 16 then uses the dedicated resource to transmit a RNG-REQ message 1108. The base station 14 then sends back an acknowledgment in the form of a RNG-RSP message 1110, which may include a renewed authentication key. If the RNG-RSP message 1110 includes a renewed authentication key, the mobile terminal 16 replies with a PKM-REQ message 1112.

In a second approach, LU_REQ/RSP messages are used for location updates rather than RNG-REQ/RSP messages.

Figure 12:
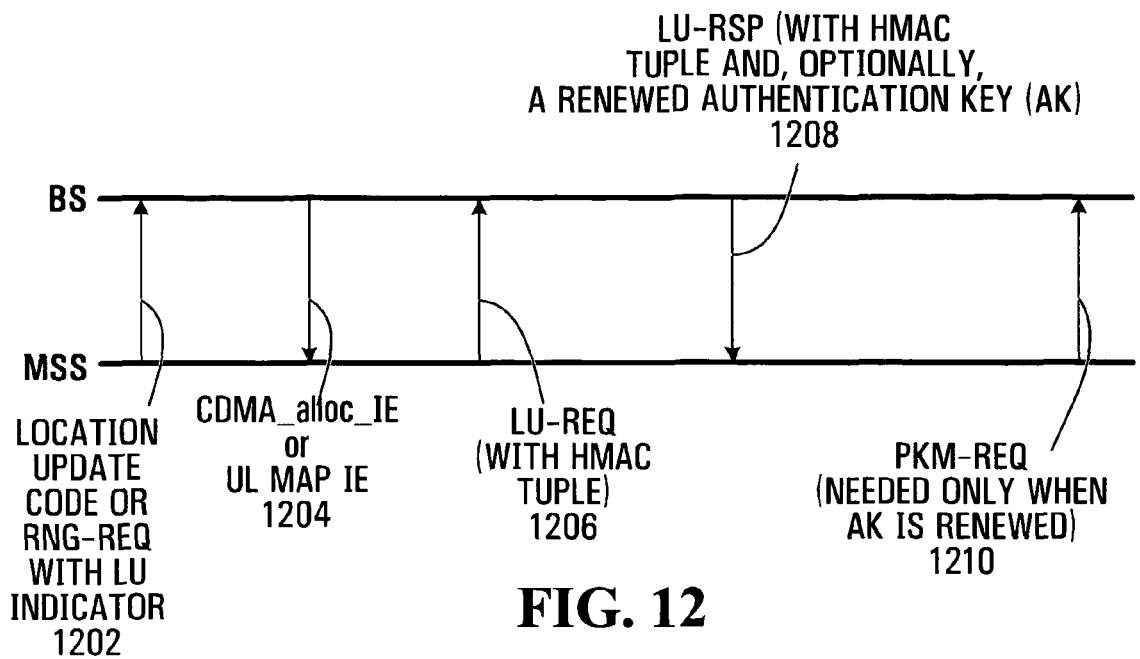
FIG. 12 is a signaling diagram for communication between a base station and a wireless terminal according to a further embodiment of the invention.

In operation of the second approach in view of FIG. 12, a mobile terminal 16 may initiate a location update by transmitting, to a base station 14, a location update code 1202, which may be randomly selected from code pool defined for the purpose of location updates, or a RNG-REQ message 1202 with a location update indicator. After the base station 14 receives the location update indication 1202, the base station 14 allocates a dedicated resource to the mobile terminal 16 to use for transmission of a location update. The base station 14 may indicate the dedicated resource to the mobile terminal 16 in a CDMA_alloc_IE message or in an uplink MAP information element 1204. The mobile terminal 16 then uses the dedicated resource to transmit a LU-REQ message 1206 including a 6-byte location update header (see FIG. 9) with the 38-bit reduced MAC address for the mobile terminal 16. The base station 14 then sends back an acknowledgment in the form of a LU-RSP message 1208, which includes the location update header and may include a renewed authentication key. If the LU-RSP message 1208 includes a renewed authentication key, the mobile terminal 16 replies with a PKM-REQ message 1210.

Figure 13:
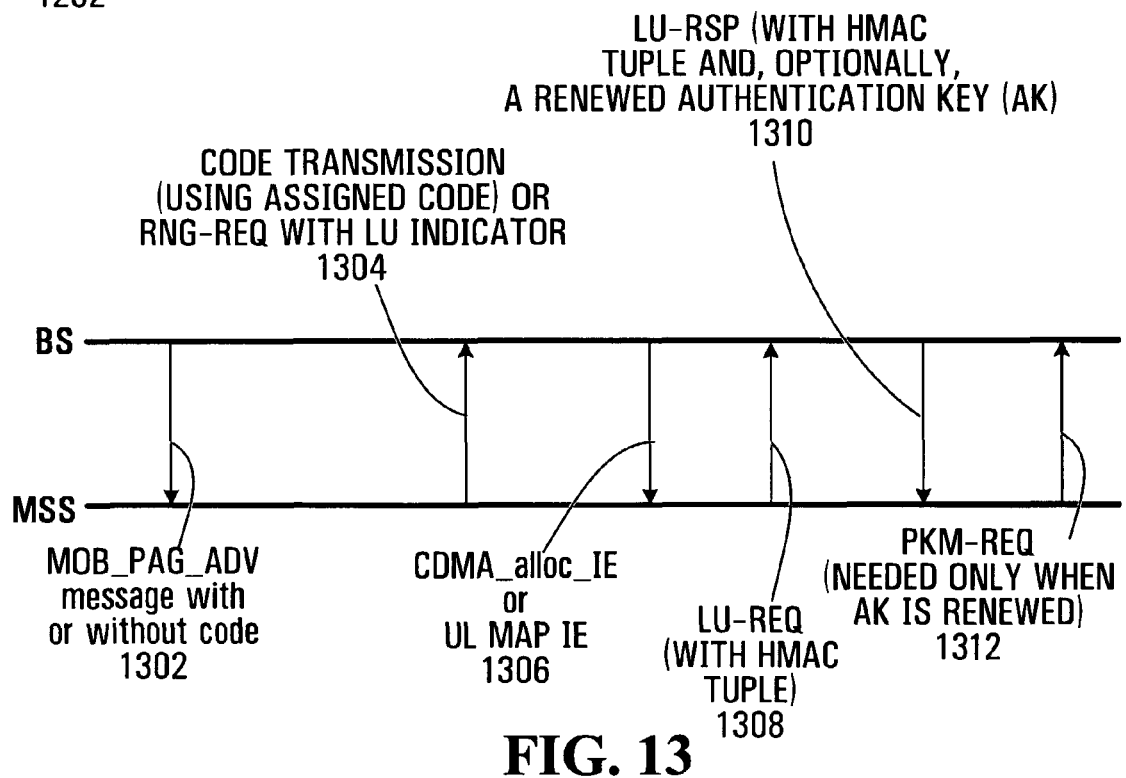
FIG. 13 is a signaling diagram for communication between a base station and a wireless terminal according to a still further embodiment of the invention.

FIG. 13 illustrates an exchange between a base station (BS) 14 and a mobile terminal (MSS) 16 for a location update initiated by the base station 14. To initiate the location update, the base station 14 may transmit a paging message, identified as MOB_PAG_ADV 1302. The paging message 1302 may or may not include an indication of a code and an opportunity assigned by the base station 14 to the mobile station 16. Where the paging message 1302 has included a code and an opportunity, the mobile terminal 16 may transmit the code 1304 to the base station 14. Alternatively, the mobile terminal 16 may transmit a RNG-REQ message 1304 with a location update indicator. Upon receipt of either type of response 1304 to the paging message 1302, the base station 14 may be able to determine aspects of the channel including such aspects as power, time and frequency of the mobile terminal 16. With knowledge of such aspects of the channel, the base station 14 may allocate a dedicated resource to subsequent communication between the base station 14 and the mobile terminal 16 (such as registration, etc.).

After the base station 14 receives the code or the RNG-REQ message 1104, the base station 14 allocates a dedicated resource to the mobile terminal 16 to use for transmission of a location update. The base station 14 may indicate the dedicated resource to the mobile terminal 16 in a CDMA_alloc_IE message or in an uplink MAP information element 1306. The mobile terminal 16 then uses the dedicated resource to transmit a LU-REQ message 1308 including a 6-byte location update header (see FIG. 9) with the 38-bit reduced MAC address for the mobile terminal 16. The base station 14 then sends back an acknowledgment in the form of a LU-RSP message 1310, which includes the location update header and may include a renewed authentication key. If the LU-RSP message 1310 includes a renewed authentication key, the mobile terminal 16 replies with a PKM-REQ message 1312.

Figure 14:
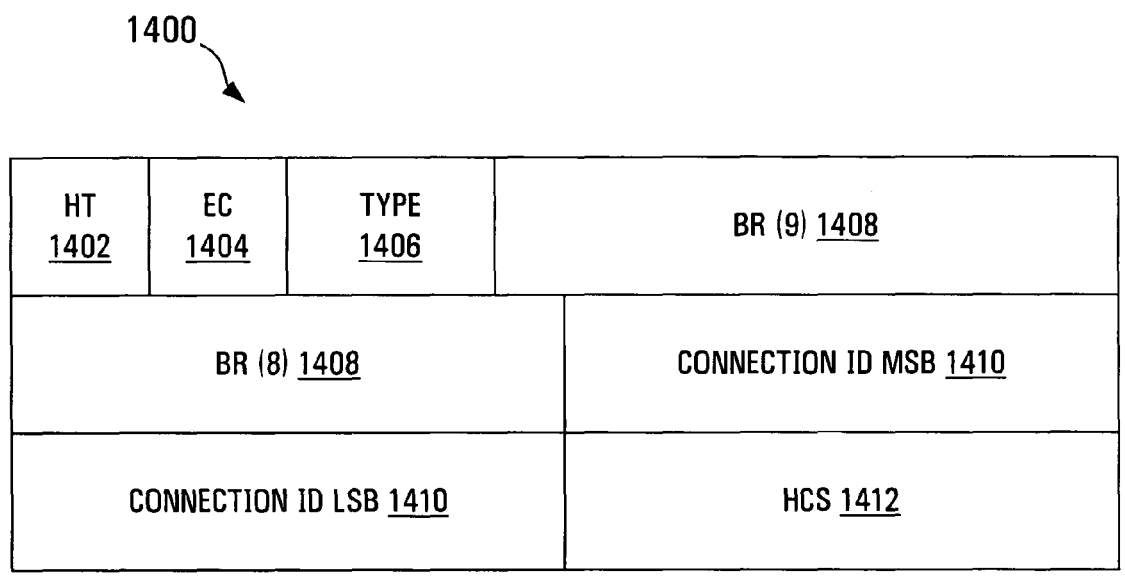
FIG. 14 illustrates an uplink Short Data Burst Bandwidth Request Header according to an embodiment of the present invention.

FIG. 14 illustrates an uplink Short Data Burst Bandwidth (UL-SDB-BW) Request Header 1400 in accordance with an embodiment of the invention. The UL-SDB-BW Request Header 1400 may be used by a mobile terminal 16 in sleep mode to send an uplink resource request for short-data-burst transmission. In particular, the UL-SDB-BW Request Header 1400, as illustrated, includes an HT field 1402 for indicating a header type, an EC field 1404 for indicating whether encryption is used, a type field 1406, a byte request (BR) field 1408 for indicating a number of bytes requested, a connection ID field 1410 and a HCS field 1414 for indicating a header check sequence.

Where the contents of the HT field 1402 are set to 1, it is considered that the UL-SDB-BW Request Header 1400 is a bandwidth request header. Where the contents of the EC field 1404 are set to 0 by a mobile terminal 16, the UL-SDB-BW Request Header 1400 is considered not to be encrypted. The connection ID field 1410 may be used for indicating the connection ID for which the uplink bandwidth is requested.

In accordance with an embodiment of the invention, a UL-SDB-BW Request PDU may include the UL-SDB-BW Request Header 1400 and might not contain a payload.

A mobile terminal 16 receiving the UL-SDB-BW request header 1400 on the downlink may elect to discard the PDU.

Fields of a Grant Management sub-header are illustrated in a table 1500 in FIG. 15.

The Grant Management sub-header may be used by a mobile terminal 16 in sleep mode to indicate that the payload in a corresponding PDU is an uplink Short Data Burst (SDB). When used for this purpose, all 16 bits of the Policy Based Routing field may be set to 0.

A location Update request TLV (Type/Length/Value), from section 11 of p802.16(e), may be used to indicate a location update request or uplink SDB indication by a mobile terminal 16 in idle mode. When used to indicate a UL SDB, the mobile terminal 16 is informing a base station 14 that the purpose of ranging is to adjust time, power, etc., in order to send an uplink SDB. For any uplink SDB transmission from a mobile terminal 16 in idle mode, the base station 14 may update the location of the mobile terminal 16 at the same time.

The location Update request TLV, may be used as a location update response or a downlink SDB indication. When used as downlink SDB indication, the mobile terminal 16 may understand that the base station 14 is going to send downlink SDB after finishing the ranging.

Fields of a SDB Forecast information element are illustrated in a table 1600 in FIG. 16.

The SDB Forecast information element may be used by a base station 14 to alert mobile terminal 16 regarding future downlink SDB transmissions and uplink SDB polling.

After receiving the SDB Forecast information element, a mobile terminal 16, if its CID is included in the SDB Forecast information element, may monitor the DL-MAP and UL-MAP in the frame indicated by Frame_offset in the SDB Forecast information element.

Fields of a downlink SDB information element are illustrated in a table 1700 in FIG. 17.

The downlink SDB information element may be used by a base station 14 to assign downlink resources to a mobile terminal 16 for the purpose of a short data burst. The downlink resources may be assigned for the purpose of acknowledgment by the mobile terminal 16.

Fields of an uplink SDB information element are illustrated in a table 1800 in FIG. 18.

The uplink SDB information element may be used by a base station 14 to assign uplink resource to a mobile terminal 16 for the purpose of short data burst. The acknowledgment to the UL short data burst transmission may be enabled or disabled dynamically.

Fields of an SDB_Ack information element are illustrated in a table 1900 in FIG. 19.

The SDB_Ack information element may be used by a base station 14 to acknowledge the uplink SDB transmission.

RNG_REQ Message Encodings are illustrated in a table 2000 in FIG. 20.

RNG_RSP Message Encodings are illustrated in a table 2100 in FIG. 21.

Other modifications will be apparent to those skilled in the art and, therefore, the invention is defined in the claims.

We claim:

1. At a base station in a wireless communication network, a method of alerting a mobile terminal regarding a future downlink short data burst transmission, said method comprising:
   transmitting a short data burst forecast information element regarding the future downlink short data burst transmission on a downlink from the base station to the mobile terminal, said information element including:
   an indication of an identity of a connection; and
   an indication of a frame on the downlink for the mobile terminal to monitor during which the future downlink short data burst transmission is to be transmitted.

2. The method of claim 1 wherein said indication of said frame is provided as a frame offset relative to a current frame.

3. The method of claim 1, wherein the transmitting of the short data burst forecast information element uses a time division duplex frame.

4. The method of claim 1, wherein the transmitting of the short data burst forecast information element uses a code division multiple access protocol.

5. The method of claim 1 wherein the transmitting of the short data burst forecast information element uses a orthogonal frequency division multiple access protocol.

6. The method of claim 1, further comprising:
receiving a location update indicator message from the mobile terminal;
allocating a further future downlink short data burst to the mobile terminal; and
transmitting a further short data burst forecast information element to the mobile terminal, the further allocation message indicating a further frame where the further future downlink short data burst is to be transmitted.

7. The method of claim 1, further comprising:
transmitting a page to the mobile terminal.

8. At a base station in a wireless communication network, a method of assigning downlink resources to a mobile terminal, said method comprising:
transmitting a downlink short data burst information element on a downlink from the base station to the mobile terminal, said information element including:
an indication of a frame on the downlink for the mobile terminal to monitor during which said downlink short data burst is to be transmitted; and
an indication of whether an uplink resource is assigned in said information element for said mobile terminal to send an acknowledgement request message.

9. The method of claim 8, wherein the transmitting of the downlink short data burst information element uses a time division duplex frame.

10. The method of claim 8, wherein the transmitting of the downlink short data burst information element uses a code division multiple access protocol.

11. The method of claim 8 wherein the transmitting of the downlink short data burst information element uses a orthogonal frequency division multiple access protocol.

12. At a base station in a wireless communication network, a method of assigning uplink resources to a mobile terminal, said method comprising:
receiving a location update indicator message from the mobile terminal;
allocating a dedicated resource to the mobile terminal based on the location update; and
transmitting an uplink short data burst information element, said information element including:
an indication of the dedicated resource for the mobile terminal to use for said uplink short data burst; and
an indication of whether said mobile terminal is to wait to receiving an acknowledgment for each data burst transmission.

13. The method of claim 12, wherein the transmitting of the uplink short data burst information element uses a time division duplex frame.

14. The method of claim 12, wherein the transmitting of the uplink short data burst information element uses a code division multiple access protocol.

15. The method of claim 12 wherein the transmitting of the uplink short data burst information element uses a orthogonal frequency division multiple access protocol.

16. A base station in a wireless communications system adapted to perform the method of claim 1.

17. A base station in a wireless communications system adapted to perform the method of claim 8.

18. A base station in a wireless communications system adapted to perform the method of claim 12.

* * * * *

UNITED STATES PATENT AND TRADEMARK OFFICE
CERTIFICATE OF CORRECTION

PATENT NO. : 9,282,535 B2  
APPLICATION NO. : 13/666479  
DATED : March 8, 2016  
INVENTOR(S) : Zhang et al.

It is certified that error appears in the above-identified patent and that said Letters Patent is hereby corrected as shown below:

Title Page, Item 62 should be replaced with the following Line:

"Division of application No. 13/209,019, filed on Aug. 12, 2011, now Pat. No. 8,917,703, which is a division of application No. 11/571,094, filed on Dec. 21, 2006, now Pat. No. 8,014,377, which is a national stage entry of application No. PCT/CA2005/000992, filed on Jun. 27, 2005."

Signed and Sealed this  
Sixteenth Day of August, 2016

Michelle K. Lee  
*Director of the United States Patent and Trademark Office*